US012714635B2

(12) United States Patent
Luo

(10) Patent No.: US 12,714,635 B2
(45) Date of Patent: Aug. 25, 2026

(54) MASSAGER

(71) Applicant: Dongguan Duoguo Zhichuang Technology Co., Ltd., Dongguan (CN)

(72) Inventor: Changzhi Luo, Dongguan (CN)

(73) Assignee: Dongguan Duoguo Zhichuang Technology Co., Ltd., Dongguan City (CN)

( * ) Notice: Subject to any disclaimer, the term of this patent is extended or adjusted under 35 U.S.C. 154(b) by 812 days.

(21) Appl. No.: 18/113,639

(22) Filed: Feb. 24, 2023

(65) Prior Publication Data

US 2023/0277408 A1 Sep. 7, 2023

(30) Foreign Application Priority Data

Feb. 25, 2022 (CN) ......................... 202220408054.1
Jun. 6, 2022 (CN) ......................... 202221405082.4

(51) Int. Cl.
*A61H 19/00* (2006.01)

(52) U.S. Cl.
CPC ..... *A61H 19/32* (2013.01); *A61H 2201/1215* (2013.01); *A61H 2201/1463* (2013.01); *A61H 2201/149* (2013.01); *A61H 2205/087* (2013.01)

(58) Field of Classification Search
None
See application file for complete search history.

(56) References Cited

U.S. PATENT DOCUMENTS

2012/0157899 A1 6/2012 Terada et al.
2016/0008214 A1* 1/2016 Giampietro ............ A61H 19/32 600/38
2020/0405562 A1 12/2020 Kodama
2021/0137775 A1 5/2021 Kim et al.
2023/0080795 A1* 3/2023 Raju ...................... A61H 9/005 600/38

FOREIGN PATENT DOCUMENTS

CN 109953881 A * 7/2019 ............. A61H 19/00
WO WO-2005099366 A2 * 10/2005 ............. A61H 19/32
WO WO-2014107893 A1 * 7/2014 ......... A61H 23/0263
WO WO-2017122030 A1 * 7/2017 ............. A61H 19/32

OTHER PUBLICATIONS

Translation of CN 109953881-A. Accessed from PE2E-Search on Nov. 14, 2025. (Year: 2019).*
Translation of WO 2014/107893. Accessed from PE2E-Search on Nov. 14, 2025. (Year: 2014).*

* cited by examiner

*Primary Examiner* — Paige Kathleen Bugg

(57) ABSTRACT

The disclosure provides a massager, an accommodating hole is provided on a housing, a sleeve body is axially provided in a cavity of the accommodating hole, and the sleeve body is in running fit with a cavity wall of the accommodating hole; an elastic cylinder body is fixed in a cavity of the sleeve body, and a plurality of elastic protrusions are distributed on a cavity wall of the cylinder body; and a side portion of the accommodating hole forms a first housing cavity, a first driving motor is provided in the first housing cavity, and the first driving motor is in transmission fit with the sleeve body via a transmission mechanism. The first driving motor drives the elastic cylinder body to perform rotary motion to facilitate massage, so as to promote blood circulation of corresponding massaged region and improve comfort.

13 Claims, 11 Drawing Sheets

MASSAGER

TECHNICAL FIELD

The disclosure pertains to the technical field of massaging devices, and specifically pertains to a massager.

BACKGROUND

With the increasingly rapid pace of life, people are also facing ever-increasing work pressure. In order to complete work tasks, people often work overtime. After one day of intense work, the body becomes exhausted. In order to relieve fatigue and maintain physical and mental health, people generally use massagers to relax the body. The prior art massagers generally require human to initiatively apply a force to obtain frictional massage or vibrating massage.

Initiatively applying a force to obtain frictional massage is laborious for users and results in poor massage experience.

With regard to the vibrating massage, a motor drives an eccentric structure to rotate to generate vibration, the massager contacts a massaged region of the human body and transmits the vibration to the human body, thereby achieving the effect of massaging the body. However, the vibrating massager has a strong sense of vibration during massage, making the massage uncomfortable, resulting in poor effect, and affecting the user experience.

SUMMARY

In order to solve at least one of the above technical defects, the disclosure provides the following technical schemes:

This application pertains to a massager which comprises a housing, wherein

- an accommodating hole is provided on the housing in a penetrating manner, a sleeve body is axially provided in a cavity of the accommodating hole, and the sleeve body is in running fit with a cavity wall of the accommodating hole;
- an elastic cylinder body is axially fixed in a cavity of the sleeve body, and a plurality of elastic protrusions are distributed on a cavity wall of the cylinder body; and
- a side portion of the accommodating hole forms a first housing cavity, a first driving motor is provided in the first housing cavity, and the first driving motor is in transmission fit with the sleeve body via a transmission mechanism to drive the sleeve body to rotate axially.

According to the massager, the transmission mechanism comprises a gear and a gear ring provided on the sleeve body, the gear ring is outwards convexly formed along a circumferential direction of the sleeve body, the gear is driven to rotate by a driving force directly provided by the first driving motor or a driving force indirectly provided by the first driving motor, the gear is arranged in mesh with the gear ring to drive the sleeve body to rotate, and the gear is a spur gear, a turbine or a straight bevel gear.

According to the massager, the gear ring comprises a ring body outwards convexly formed along the circumference of the sleeve body and a plurality of gear teeth formed on the ring body, and the plurality of gear teeth are arranged in an annular array and meshed with the gear.

According to the massager, the housing comprises an outer housing and a cylindrical inner housing, the accommodating hole is provided on the outer housing, the cylindrical inner housing is axially fixed in the cavity of the accommodating hole, and the cylindrical inner housing is nested with the sleeve body.

According to the massager, the sleeve body comprises an inner sleeve and a rotary sleeve, a gear ring is provided on the rotary sleeve, a turbine is provided along a radial direction of the inner sleeve, the inner sleeve is in running fit with a cavity wall of the accommodating hole, the rotary sleeve is sleeved on the inner sleeve, the rotary sleeve is connected with the inner sleeve via a linear translation guide structure, an outer wall of the inner sleeve is provided with a guide portion, the cavity of the accommodating hole is provided with a fixedly arranged positioning member, the positioning member is in fit with the guide portion to enable the rotating inner sleeve to perform telescopic translation, the positioning member is arranged on an inner wall of the cylindrical inner housing, and the cylinder body is axially fixed in a cavity of the inner sleeve.

According to the massager, the positioning member comprises a column body, the guide portion comprises an annular track groove arranged along a circumferential direction of the inner sleeve, the column body is placed in the annular track groove, the annular track groove comprises two sections of linear grooves and two sections of inclined grooves which are oppositely arranged, both ends of one section of linear groove are respectively connected and communicated with one end of each of the two sections of inclined grooves via transition grooves, and both ends of the other section of linear groove are respectively connected and communicated with the other end of each of the two sections of inclined grooves via transition grooves.

According to the massager, the linear translation guide structure comprises a positioning column formed on an inner wall of the rotary sleeve and a linear guide long groove formed on the outer wall of the inner sleeve, and the positioning column is inserted into the linear guide long groove.

According to the massager, the gear is a turbine arranged in the first housing cavity along a radial direction of the sleeve body, the transmission mechanism further comprises a first worm, the turbine is in meshing connection with the first worm and the gear ring respectively, and the first worm is fixed on an output shaft of the first driving motor.

According to the massager, a first mounting rack is provided in the first housing cavity, the first driving motor is mounted on the first mounting rack, a first stop plate is provided on the first mounting rack and extends to the front of an end portion of the sleeve body so as to limit the gear ring at the end portion of the sleeve body.

According to the massager, a second driving motor and a second worm are further provided in the first housing cavity, the second worm is meshed with the turbine, the second worm is fixed on an output shaft of the second driving motor, and the second driving motor is mounted on the first mounting rack.

According to the massager, a side portion of the accommodating hole further forms a second housing cavity, a third driving motor, a third worm, and a first turbine are provided in the second housing cavity, the first turbine is meshed with the third worm and the plurality of gear teeth of the gear ring respectively, and the third worm is fixed on an output shaft of the third driving motor.

According to the massager, a second mounting rack is provided in the second housing cavity, and the third driving motor is mounted on the second mounting rack.

According to the massager, a second stop plate is provided on the second mounting rack, and an inner wall of the second stop plate is close to a side surface of the gear ring relative to the gear teeth.

According to the massager, the housing has a left portion and a right portion which are fixedly formed, grooves are formed on surfaces corresponding to the left portion and the right portion, the left portion and the right portion are combined to form the accommodating hole, and the first housing cavity is formed inside the right portion.

According to the massager, a battery, a control circuit board, and a switch are provided on the first mounting rack, and the control circuit board is connected with the battery, the switch, and the driving motors respectively.

According to the massager, the cylinder body is made of silica gel, and sheet-like protrusions are spaced at both end cavity walls in a cylinder cavity of the cylinder body, and the columnar protrusions are spaced at a middle cavity wall in the cylinder cavity.

Compared with the prior art, the disclosure has the following beneficial effects:

1. The housing is provided with a hole to mount the sleeve body, the elastic cylinder body is fixed in the sleeve body, the cylinder body can be of a through hole type or a blind hole type, the driving motors are used as a power source, the sleeve body is driven to rotate around an own axial centerline thereof under the action of the transmission mechanism, and the cylinder body is synchronously driven to rotate. To massage, a person can place a region to be massaged into the cylinder body, and during rotation of the cylinder body, the elastic protrusions in the cavity are used to perform massage to achieve rotating massage, which has the advantages of relieving fatigue, promoting blood circulation and improving comfort.
2. While the elastic cylinder body is driven to perform rotary motion, the cylinder body can also be driven to perform telescopic motion, so as to further enhance the massage effect and improve user's massage experience.
3. The driving motors and part of the transmission mechanism are connected by adding the mounting racks, which reduces the forming difficulty and facilitates the assembly; the inner housing and outer housings facilitates the assembly of the sleeve body in the inner housing, and then the outer housing is fixed, which improves the assembly speed; and the mounting racks can be directly fixed on the cylindrical inner housing, which facilitates mesh with the gear ring on the sleeve body, and certainly, the mounting racks can also be fixed on the outer housing, depending on requirements.
4. In order to facilitate mounting of the sleeve body or the like, the housing is preferably a split-type structure with the left portion and the right portion formed separately. Preferably, the housing is fixedly formed in the left portion and the right portion, grooves are formed on surfaces corresponding to the left portion and the right portion, the left portion and the right portion are combined to form the accommodating hole, and an accommodating space is formed inside the right portion, the mounting racks are located in the accommodating space and stop plates are provided at end portions of the mounting racks, and the stop plates extend to the front of the end portion of the sleeve body. The fixedly formed left portion and right portion are combined to form the accommodating hole, which is convenient to directly wrap the inner housing, and helps to improve the assembly speed.
5. The control circuit board is controlled in conjunction with the switch, which facilitates operation; and a hole is provided on the housing at a position corresponding to the switch to expose the switch. In addition, functional components such as an indicator light can also be added to display the charging situation or the state of the switch, etc.
6. The cylinder body is made of silica gel which is skin-friendly, and the sheet-like protrusions cooperate with the columnar protrusions for greater comfort.

DESCRIPTION OF THE EMBODIMENTS

The disclosure will be further described below with reference to the accompanying drawings and specific embodiments.

EMBODIMENTS

Figure 1:
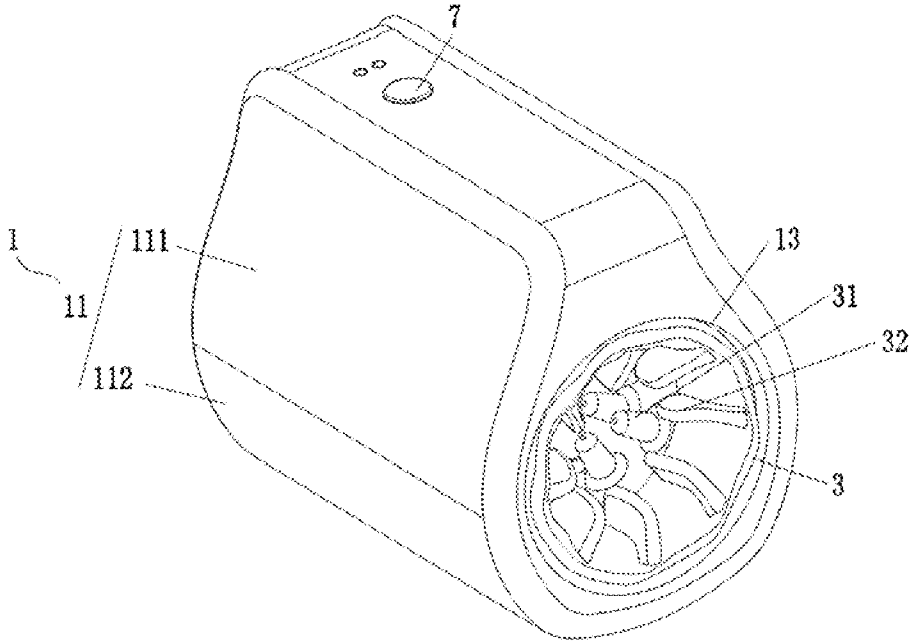
FIG. 1 is a schematic structural view of a massager.
Figure 2:
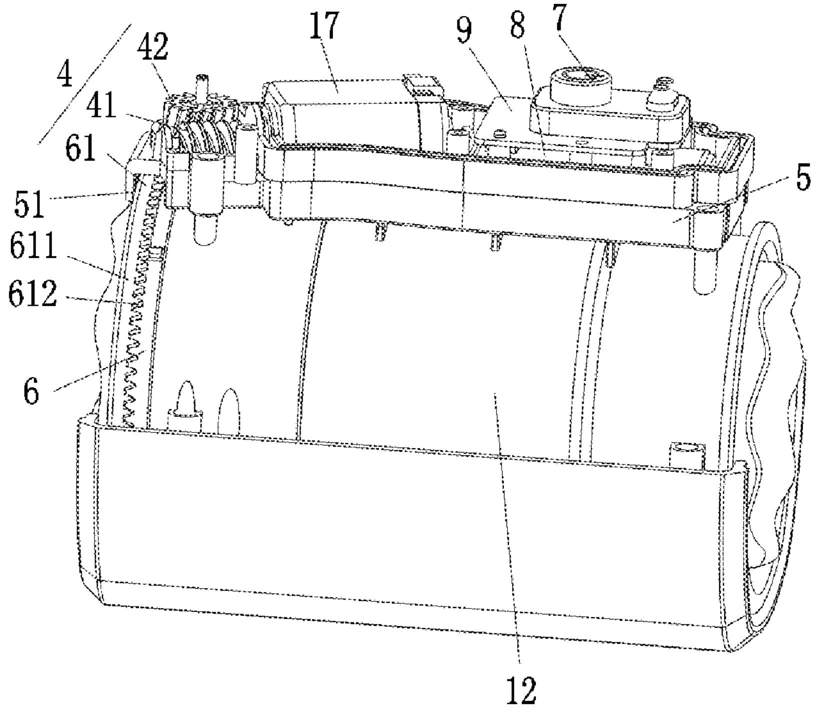
FIG. 2 is a schematic structural view (I) of the massager with a right portion of a housing removed.
Figure 7:
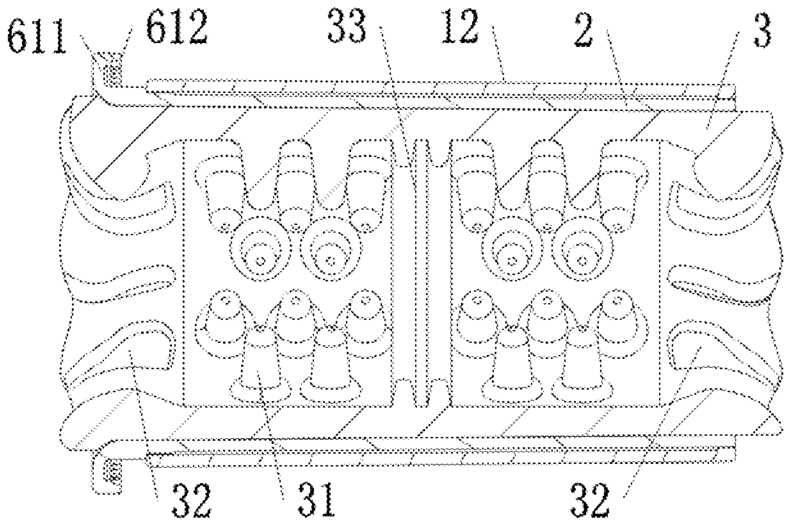
FIG. 7 is a schematic cross-sectional structural view of a fit between a sleeve body and a cylinder body.

As shown in FIGS. 1 and 2, a massager according to the present embodiment comprises a housing 1, an accommodating hole 13 is provided on the housing 1 in a penetrating manner, the accommodating hole 13 is a through hole structure, a sleeve body 2 is axially mounted in a cavity of the accommodating hole 13, and an outer wall of the sleeve body 2 is in running fit with a cavity wall of the accommodating hole 13; and a cylinder body 3 made of silica gel is axially fixed in a cavity of the sleeve body 2, the cylinder body 3 has elasticity, and a plurality of elastic protrusions are distributed on a cavity wall of the cylinder body 3. As shown in FIG. 7, both a cavity of the cylinder body 3 and the cavity of the sleeve body 2 are through hole structures, the cavity of the cylinder body 3 is a cylinder cavity, columnar elastic protrusions 31 are radially outwards convexly formed on the cavity wall in the middle of the cylinder cavity, the columnar elastic protrusions 31 are evenly distributed at intervals, and sheet-like elastic protrusions 32 are evenly distributed at intervals in a circumferential direction on the cavity walls at both ends of the cylinder cavity, such as arc-shaped sheet bodies shown in FIG. 7. In addition, annular raised ribs 33 may also be radially outwards formed and extend in the circumferential direction in the middle of the cylinder cavity, so as to further improve massage comfort. The elasticity of silica gel can be directly used for insertion into the cavity of the sleeve body 2, so that the cylinder body 3 made of silica gel is fixed in an interference fit with a cavity wall of the sleeve body 2.

A side portion of the accommodating hole 13 forms a first housing cavity 113, a first driving motor 17 is provided in the first housing cavity 113, and the first driving motor 17 is located at an outer side portion of the sleeve body 2; and the first driving motor 17 is in transmission fit with the sleeve body 2 via a transmission mechanism to drive the sleeve body 2 to rotate axially. As shown in FIGS. 2, 4, 5 and 6, specifically, the transmission mechanism 4 comprises a turbine 42, a first worm 41, and a gear ring 61 provided on the sleeve body, the turbine 42 is in meshing connection with the first worm 41 and the gear ring 61 respectively, and the first worm 41 is fixed on an output shaft of the first driving motor 17. The turbine 42 is arranged in the first housing cavity 113 along a radial direction of the sleeve body, the gear ring 61 comprises a ring body 611 outwards convexly formed along a circumferential direction of the sleeve body and a plurality of gear teeth 612 formed on the ring body 611, the plurality of gear teeth 612 are arranged in an annular array and meshed with the turbine 42, the ring body 611 is formed at an end portion of the sleeve body 2, and the ring body 611 is located away from a port of a cylindrical inner housing 12 in the housing 1.

Figure 18:
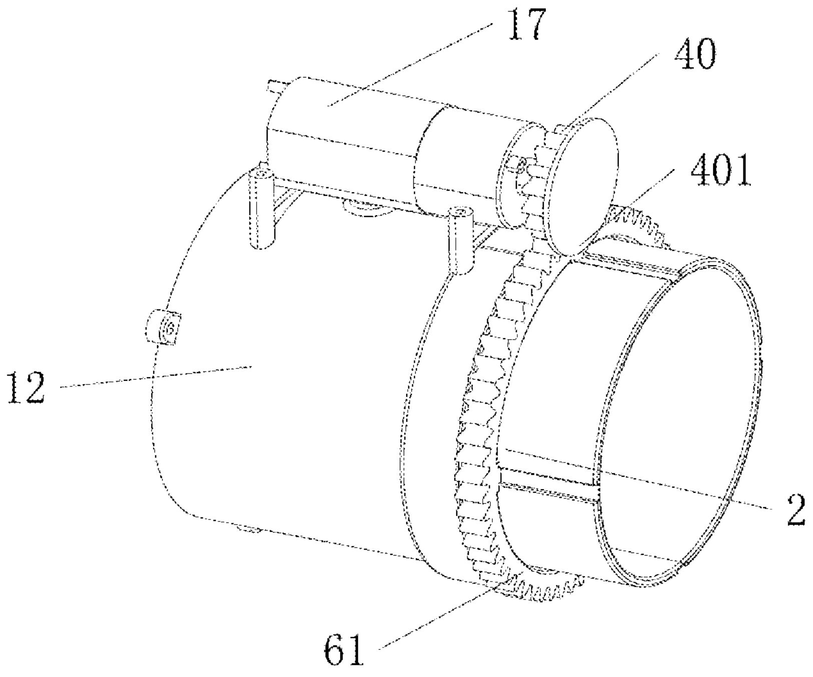
FIG. 18 is a schematic structural view of a massager having a spur gear transmission mechanism.
Figure 19:
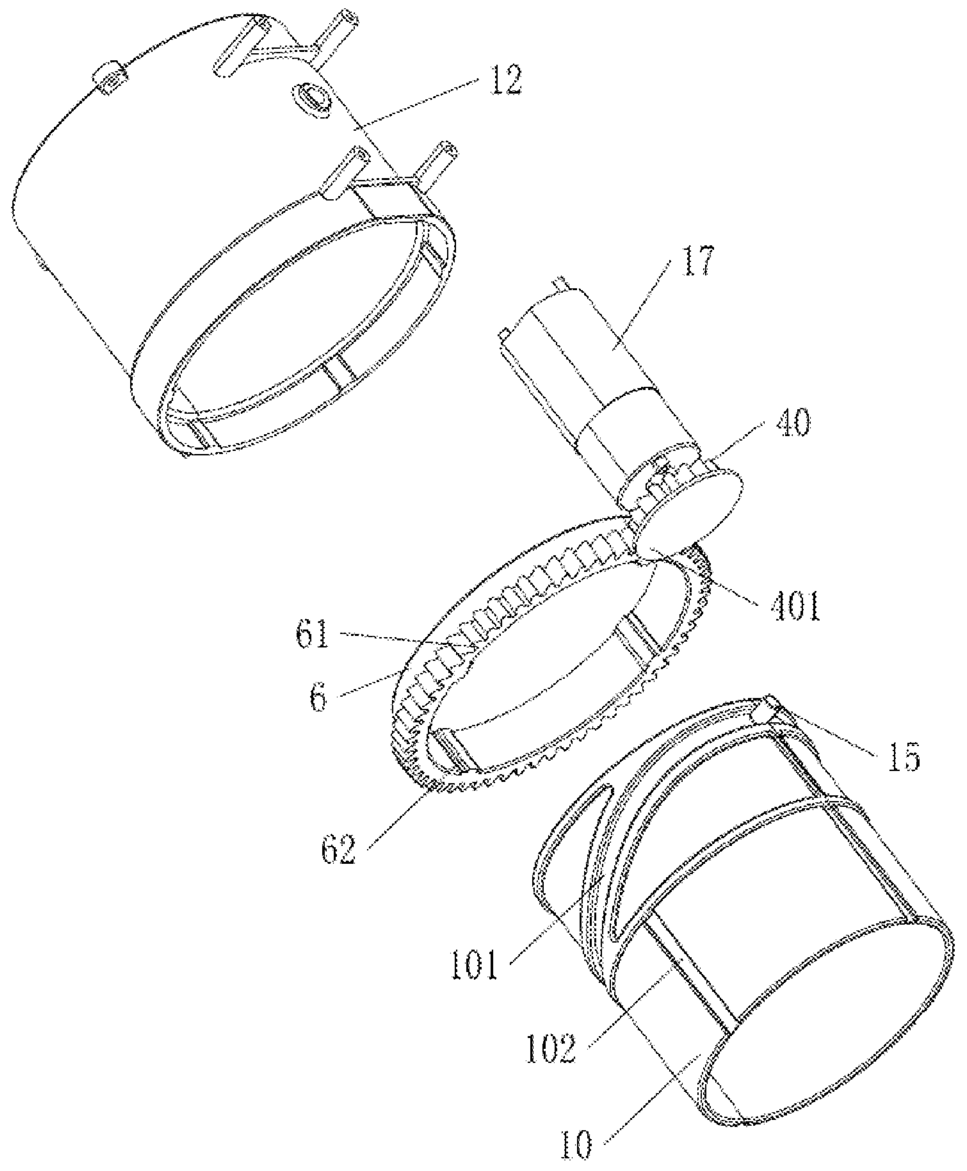
FIG. 19 is an exploded view (II).

The transmission mechanism 4 mainly drives the sleeve body 2 to rotate. For example, the turbine 42 and a worm 41 is meshed with a gear structure, a bevel gear meshing structure, a spur gear meshing structure, etc. A mounting groove, a shaft seat, etc. can be directly formed on a cavity wall of the housing 1 for fixing and connecting the transmission mechanism 4 and the first driving motor, etc., which is disadvantageous in increased forming difficulty of the housing 1. Alternatively, a rack body is added to fix the transmission mechanism 4 and the driving motor, etc., which reduces the forming difficulty of the housing 1 and the mounting rack 5, improves the yield, and facilitates the assembly. Here, a straight bevel gear is rotationally mounted above the sleeve body 2 and meshed with the gear ring, and another straight bevel gear is fixed on the output shaft of the first driving motor; such structures are relatively simple and belong to conventional technology, therefore, such structures are not shown. Alternatively, a spur gear is directly fixed with the output shaft of the first driving motor, the spur gear is meshed with the gear ring, a limiting plate is formed on the spur gear, and the limiting plate extends to the front of the end portion of the sleeve body (i.e., the front of the gear ring) so as to limit the gear ring, as shown in FIGS. 18 and 19.

Figure 3:
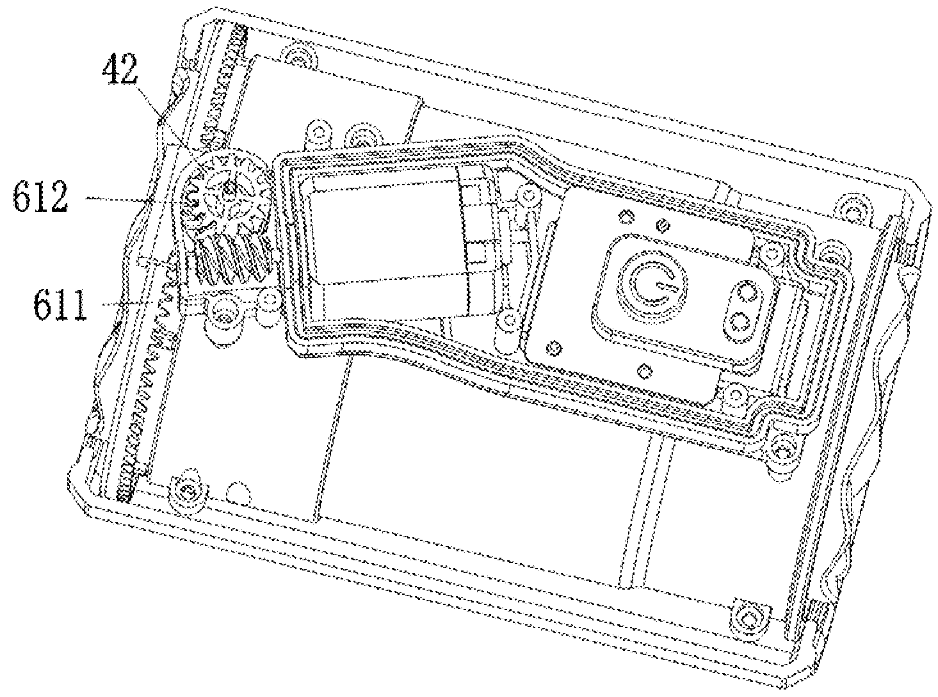
FIG. 3 is a schematic structural view (II) of the massager with the right portion of the housing removed.

In order to facilitate mounting of the first driving motor 17, etc. a first mounting rack 5 is added in the first housing cavity 113 on the side portion of the sleeve body 2, a groove for fixing the first driving motor 17 and a groove for rotationally mounting the turbine 42 are formed on the first mounting rack 5, so that a part of the gear ring 61 penetrates into the groove for mounting the turbine 42 to mesh with the turbine 42, as shown in FIG. 3.

Figure 9:
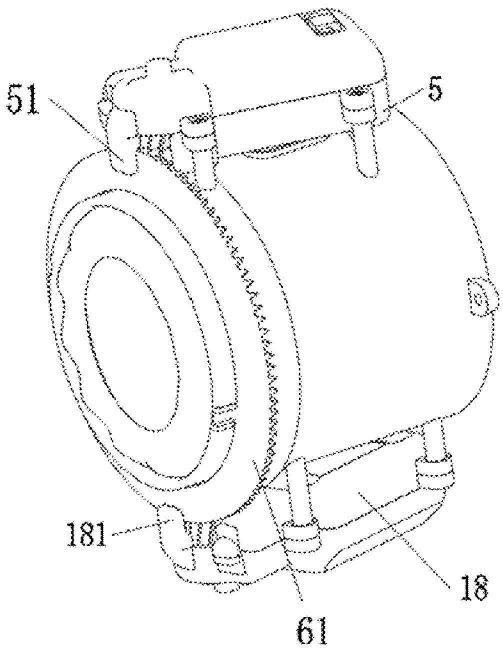
FIG. 9 is a schematic structural view of a massager having a first stop plate and a second stop plate.
Figure 15:
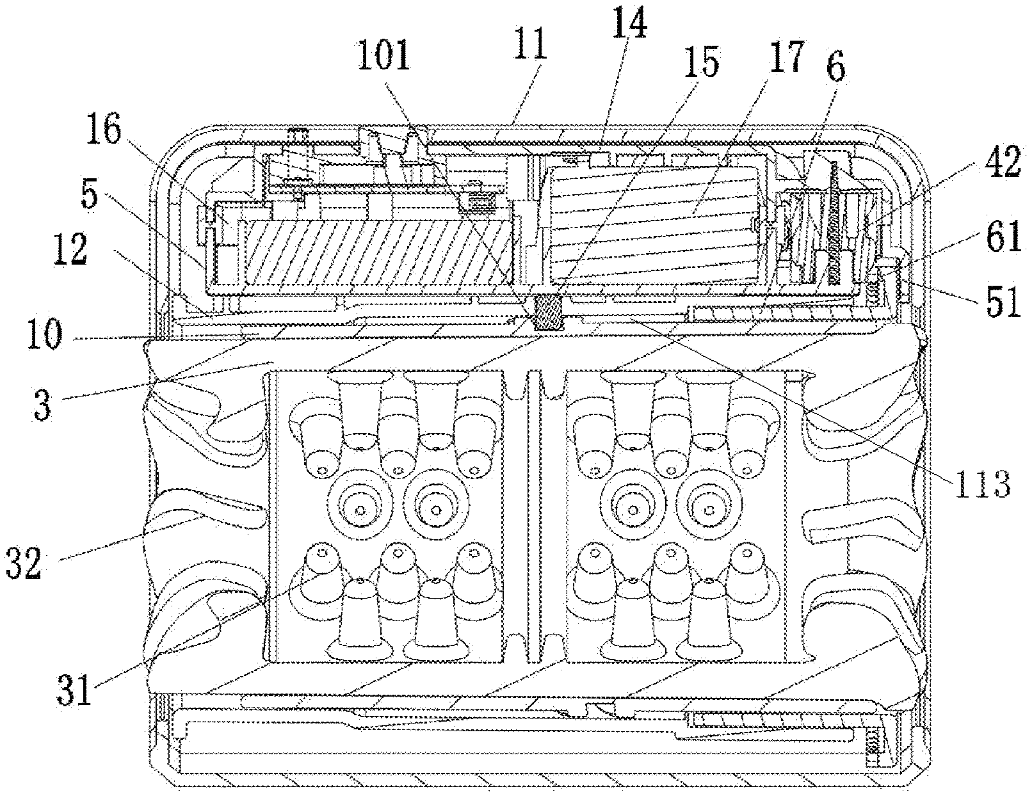
FIG. 15 is a structural section view of the integral massager.

Preferably, a groove for fixing a battery 8 is formed at the rear of the first driving motor 17, a control circuit board 9 is fixed above the battery 8, a switch 7 is fixed on the control circuit board 9, and the control circuit board 9 is connected with the battery 8, the switch 7 and the driving motor 17, so that the switch 7 is operated to control start and stop of the driving motor 17. As shown in FIGS. 1 and 9, the switch 7 is exposed from a surface of the housing 1, and an indicator light is also mounted for indicating an operating state or a charging state. An upper cover 14 of the first mounting rack 5 combines the upper cover 14 covering the battery 8, the circuit board, the battery 8, the turbine 42, the worm 41 and the driving motor 17, and the upper cover 14 and the first mounting rack 5 are sealed by a sealing ring 16 for waterproofing, and a hole is provided on the upper cover 14 and the housing 1 at a position corresponding to the switch 7 to expose the same, as shown in FIG. 15.

Further, a first stop plate 51 is provided on the first mounting rack 5, an inner wall of the first stop plate 51 is close to a side surface of the gear ring 61 relative to the gear teeth, so that the gear ring 61 is blocked and rotation of the gear ring 61 is stable, as shown in FIG. 3.

Figure 8:
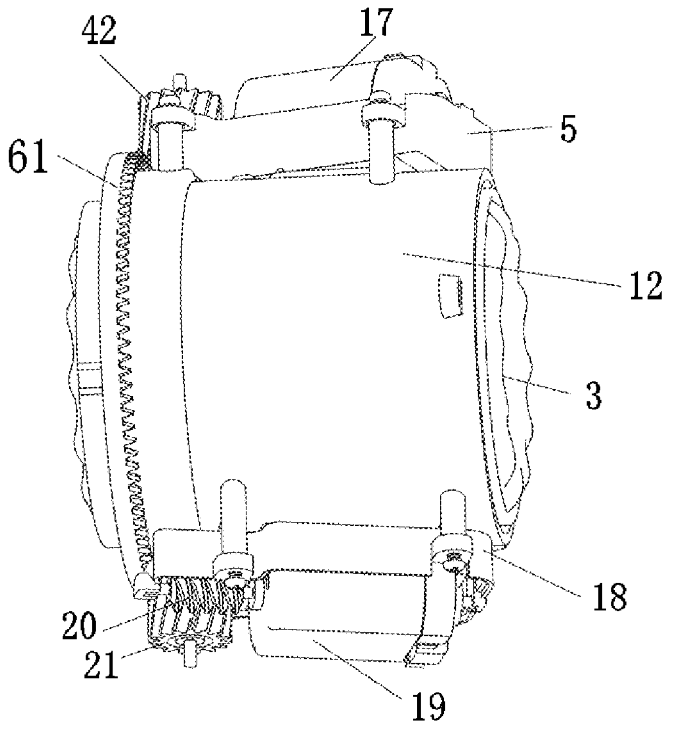
FIG. 8 is a schematic structural view of a massager with a first driving motor and a third driving motor simultaneously acting as a power source.

Based on the above description, the sleeve body 2 is of an integral structure, and when the first driving motor 17 is powered on to work, the turbine 42 and the first worm 41 are driven to drive the gear ring 61 to rotate in one direction, and then the sleeve body 2 and the cylinder body 3 are driven to rotate synchronously so as to perform rotary massage on a region of a human body to be massaged placed in the cylinder body. In order to make rotary driving effect of the sleeve body 2 better, as shown in FIG. 8, a second housing cavity 114 can be formed on the side portion of the accommodating hole, a third driving motor 19, a third worm 20 and a first turbine 21 are provided in the second housing cavity 114, the first turbine 21 is meshed with the third worm 20 and the plurality of gear teeth of the gear ring 61, the third worm 20 is fixed on an output shaft of the third driving motor 19, a second mounting rack 18 is provided in the second housing cavity 114, the third driving motor 19 is mounted on the second mounting rack 18, as shown in FIG. 9. Also, a second stop plate 181 is provided on the second mounting rack 18, an inner wall of the second stop plate 181 is close to the side surface of the gear ring 61 relative to the gear teeth 612, and when the first driving motor 17 and the third driving motor are simultaneously used as a power source to drive the sleeve body 2 to rotate, the first mounting rack 5 and the second mounting rack 18 may not be provided with a battery, a circuit board and a switch.

Of course, the sleeve body 2 may be of a split-type structure, and only the first driving motor 17, the turbine 42 and the first worm 41 are used to transmit the power source, and the specific implementation is as follows.

Figure 5:
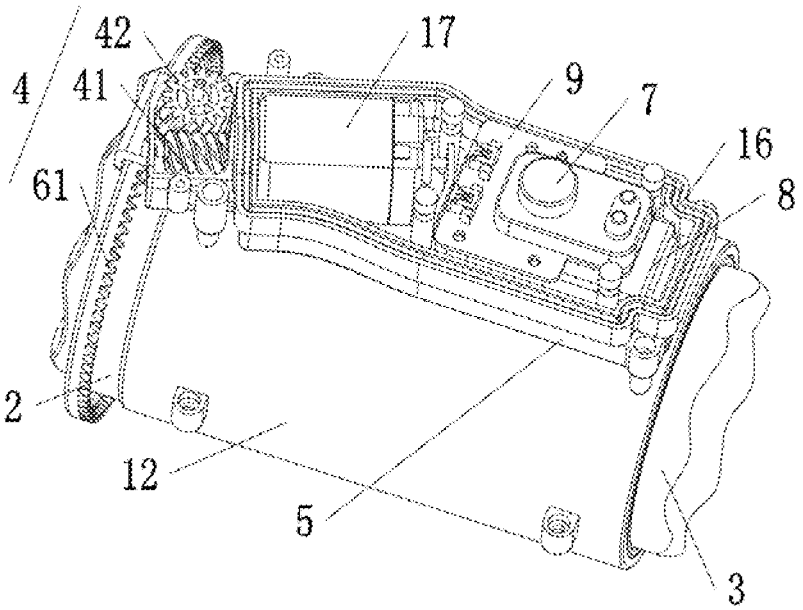
FIG. 5 is a schematic structural view (II) of the massager with the left portion and the right portion of the housing removed.
Figure 6:
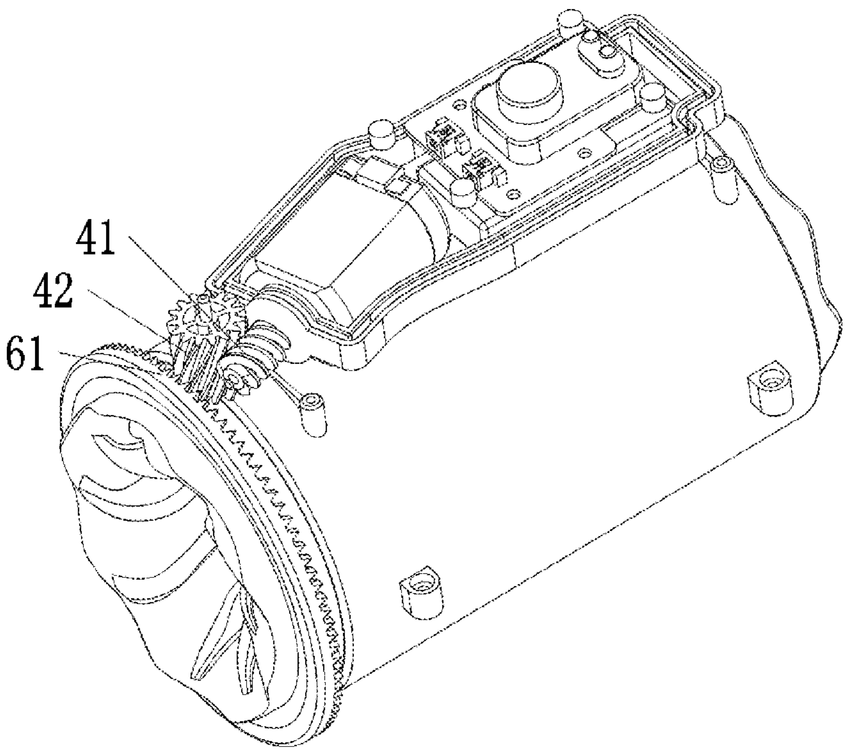
FIG. 6 is a schematic structural view (III) of the massager with the left portion and the right portion of the housing removed.
Figure 10:
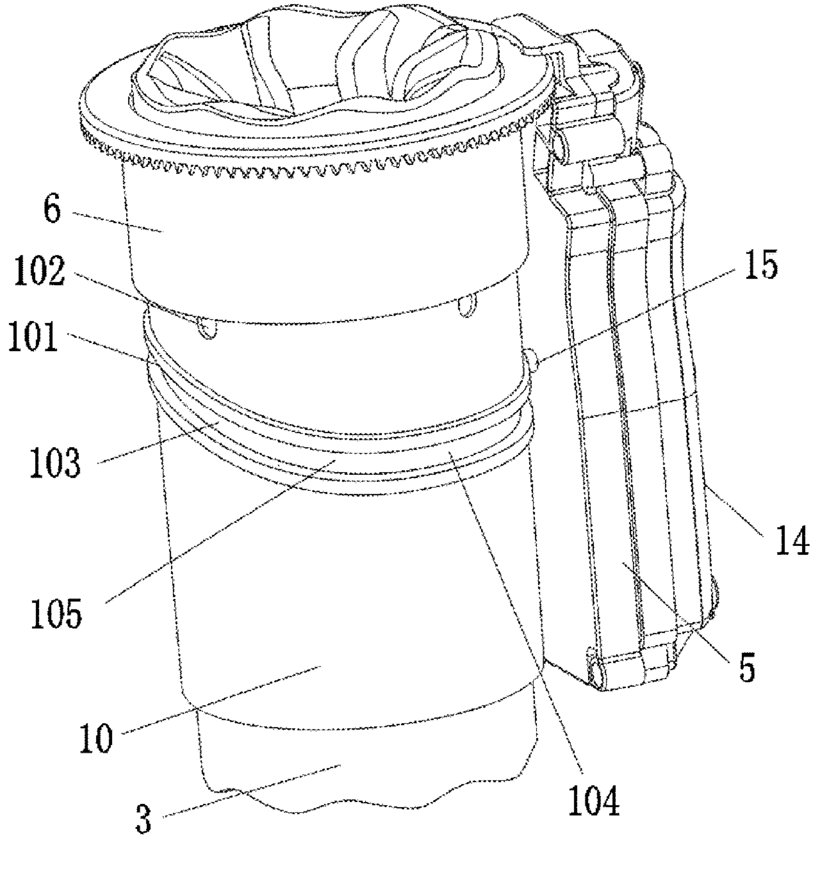
FIG. 10 is a schematic structural view of the massager with a cylindrical inner housing removed.
Figure 11:
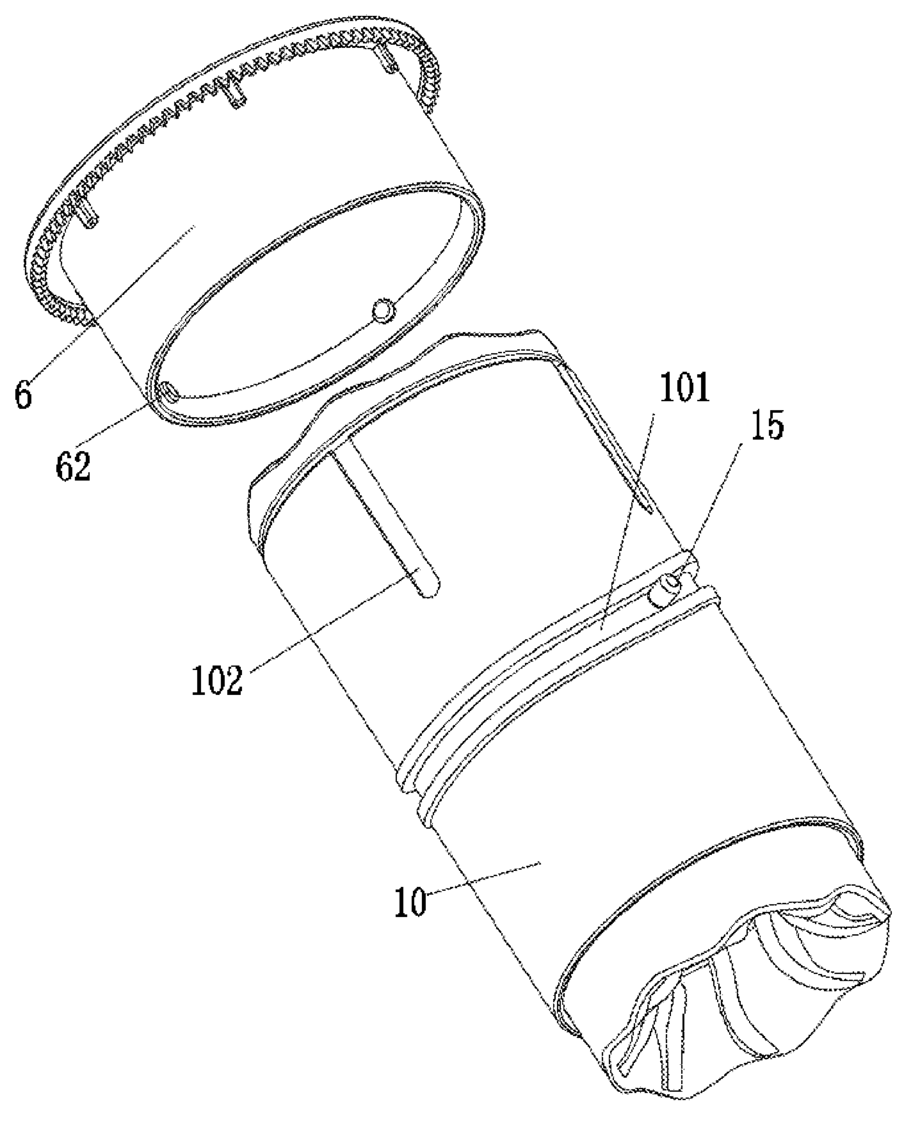
FIG. 11 is an exploded view (I)

As shown in FIGS. 10, 11 and 15, the sleeve body comprises an inner sleeve 10 and a rotary sleeve 6, both the inner sleeve 10 and the rotary sleeve 6 are also of two-end through-type structures, the housing 1, the inner sleeve 10 and the rotary sleeve 6 are all made of plastic materials, the gear ring 61 is arranged on the rotary sleeve 6, the turbine 42 is arranged along a radial direction of the inner sleeve 10, the inner sleeve 10 is in running fit with the cavity wall of the accommodating hole 13, the rotary sleeve 6 is sleeved on the inner sleeve 10, and the rotary sleeve 6 is connected with the inner sleeve 10 via a linear translation guide structure. As shown in FIG. 5, the linear translation guide structure comprises a positioning column 62 formed on an inner wall of the rotary sleeve 6 and a linear guide long groove 102 formed on an outer wall of the inner sleeve 10, and the positioning column 62 is inserted into the linear guide long groove 102. Of course, the linear translation guide structure may also comprise a linear guide long groove 102 formed on the inner wall of the rotary sleeve 6 and a positioning column 62 formed on the outer wall of the inner sleeve 10, and the positioning column 62 is inserted into the linear guide long groove 102, thus guiding telescopic linear motion of the inner sleeve 10.

Figure 12:
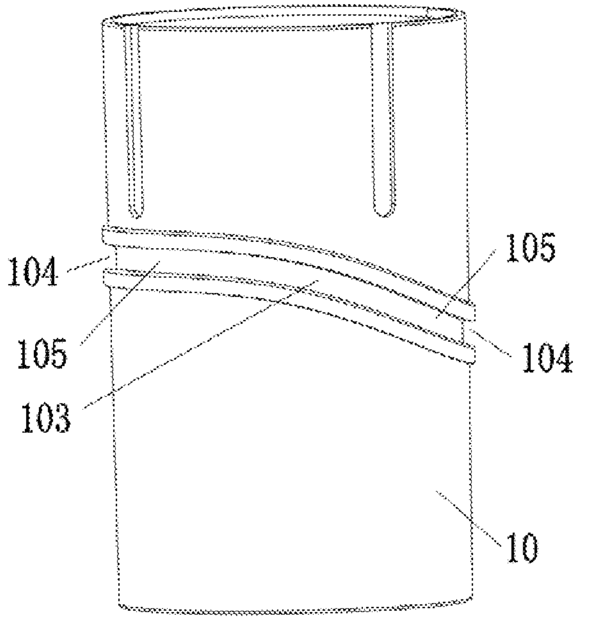
FIG. 12 is a schematic structural view (I) of an inner sleeve.
Figure 13:
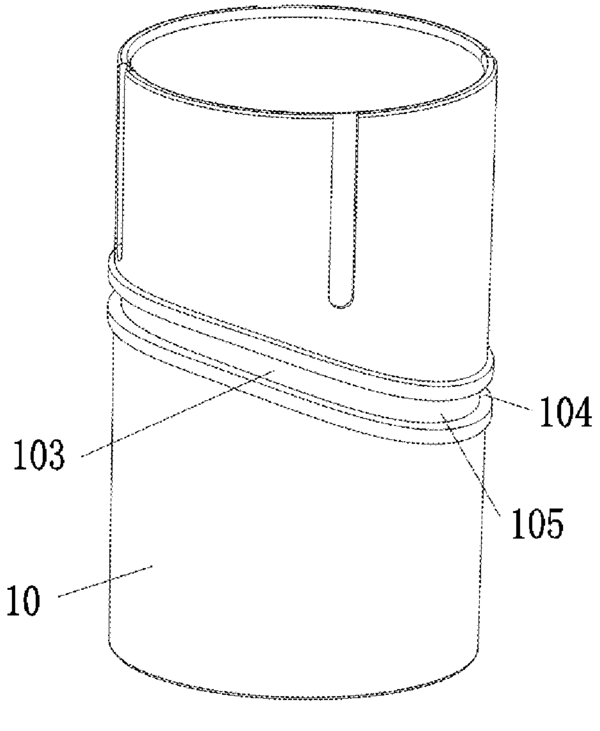
FIG. 13 is a schematic structural view (II) of the inner sleeve.
Figure 14:
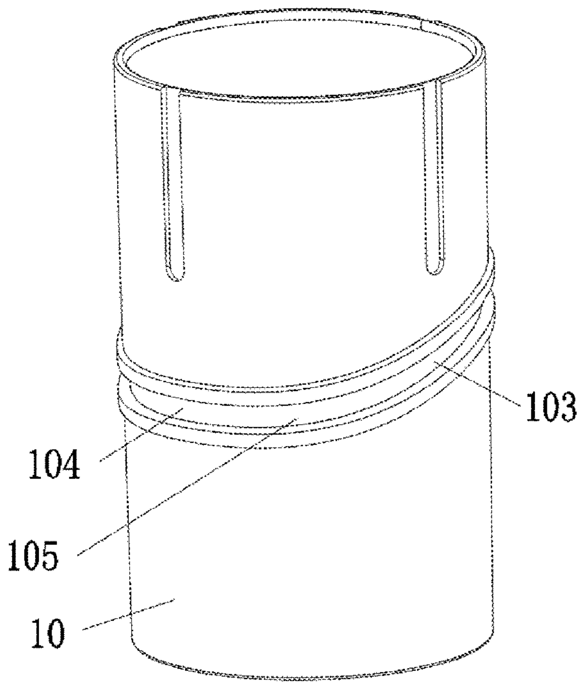
FIG. 14 is a schematic structural view (III) of the inner sleeve.

As shown in FIGS. 12-14, the outer wall of the inner sleeve 10 is provided with a guide portion, the cavity of the accommodating hole 13 is provided with a fixedly arranged positioning member 15, and the positioning member 15 is in fit with the guide portion to enable the rotating inner sleeve 10 to perform telescopic translation. The positioning member 15 comprises a column body, the guide portion comprises an annular track groove 101 arranged along a circumferential direction of the inner sleeve 10, the column body is placed in the annular track groove 101, the annular track groove 101 comprises two sections of linear grooves 104, and two sections of inclined grooves 103 which are oppositely arranged, both ends of one section of linear groove 104 are respectively connected and communicated with one end of each of the two sections of inclined grooves 103 via transition grooves 105, and both ends of the other section of linear groove 104 are respectively connected and communicated with the other end of each of the two sections of inclined grooves 103 via transition grooves 105. Alternatively, the positioning member 15 comprises a column body, the guide portion comprises an inclined guide groove or a spiral groove, and the column body is placed in the inclined guide groove or the spiral groove.

With regard to a massager formed by the sleeve body with the split-type structure, when the first driving motor 17 is powered on to work, the turbine 42 and the first worm 41 are driven to drive the gear ring 61 to rotate in one direction, and the rotary sleeve 6 and the inner sleeve 10 are synchronously rotated under the action of the linear translation guide structure, and during the rotation, the inner sleeve 10 is jointly guided by the annular track groove 101 and the positioning member 15 as well as the linear guide long groove 102 and the positioning column 62, so as to realize reciprocating telescopic linear translation of the inner sleeve 10. Since the cylinder body 3 is fixedly connected with the inner sleeve 10, when massaging, the region of the human body to be massaged is placed in the cavity of the cylinder body 3, and the cylinder body 3 is driven to perform rotary motion and telescopic motion so as to achieve massage effect.

Alternatively, when the driving motor 17 is powered on to work, the first worm 41 is driven to rotate forward and reversely; the first worm 41 is of a multiple threaded worm 41 with a large helix angle, so reverse rotation can be achieved. Therefore, the turbine 42 and the first worm 41 are driven forward and reversely so as to drive the gear ring 61 to rotate forward and reversely. Under the action of the linear translation guide structure, the rotary sleeve 6 and the inner sleeve 10 rotate forward and reversely in synchronization. During the forward and reverse rotation, the inner sleeve 10 is guided by the positioning member 15 moving back and forth in the inclined guide groove or the helical groove, and the linear guide long groove 102 is in fit with the positioning column 62 for guide, so that reciprocating telescopic linear translation of the inner sleeve 10 is achieved. Since the cylinder body 3 is fixedly connected with the inner sleeve 10, when massaging, the region of the human body to be massaged is placed in the cavity of the cylinder body 3, and the cylinder body 3 is driven to perform rotary motion and telescopic motion so as to achieve the massage effect.

In order to improve the driving effect of the split-type sleeve body, a second driving motor 22 and a second worm 23 are further provided in the first housing cavity 113, the second worm 23 is meshed with the turbine 42, the second worm 23 is fixed on an output shaft of the second driving motor 22, and the second driving motor 22 is mounted on the first mounting rack 5.

Figure 16:
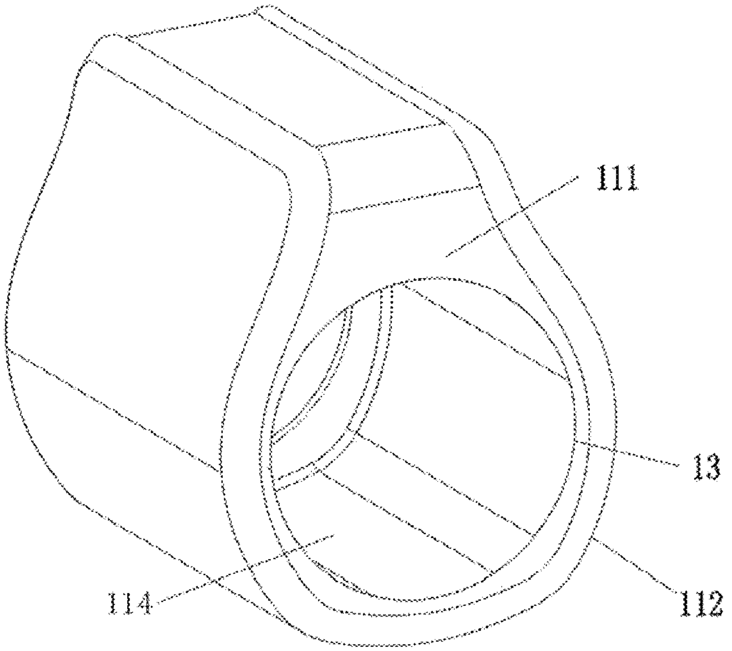
FIG. 16 is a schematic structural view of the housing.

As shown in FIGS. 1 and 16, in order to facilitate assembly and forming, the housing 1 is formed of a cylindrical inner housing 12 and an outer housing 11, and therefore the housing 1 comprises the outer housing 11 and the cylindrical inner housing 12, the accommodating hole 13 is provided on the outer housing 11, the cylindrical inner housing 12 is axially fixed in the cavity of the accommodating hole 13, and the cylindrical inner housing 12 is nested with the sleeve body. The housing 11 has a left portion 112 and a right portion 111 which are fixedly formed, and surfaces corresponding to the left portion 112 and the right portion 111 are grooved, so that the left portion 112 is U-shaped and the right portion 111 is about Y-shaped as a whole. When fixed, notches of the left portion 112 and the right portion 111 abut, two groove cavities are combined to form the accommodating hole 13, and a longitudinal end of the Y-shaped right portion 111 is hollow, that is, the first housing cavity 113 is communicated with the groove cavities and is used for accommodating components such as the first mounting rack 5 and the driving motor 17. The cylindrical inner housing 12 with two open ends is fixed in the accommodating hole 13, the cylindrical inner housing 12, the left portion 112 and the right portion 111 are all fixed by inserted connection, an insertion cylinder is formed on an outer peripheral wall of the cylindrical inner housing 12, and an insertion cylinder and an insertion column are formed on a surface where the left portion 112 and the right portion 111 abut. When the left portion 112 and the right portion 111 abut, the insertion column of the right portion 111 passes through the insertion cylinder 121 of the cylindrical inner housing 12 and is inserted into the insertion cylinder of the left portion 112, and the cylindrical inner housing 12 is fixed synchronously while the left portion 112 and the right portion 111 are fixed. In addition, a screw can be screwed into an outer peripheral wall of the left portion 112 at a position corresponding to the insertion cylinder to further fasten the connection of the insertion column and the insertion cylinder, the column body is fixed in a fixing hole of the cylindrical inner housing 12 in an interference fit manner, and the first housing cavity 113 communicated with the accommodating hole 13 is formed on the right portion 111.

Figure 4:
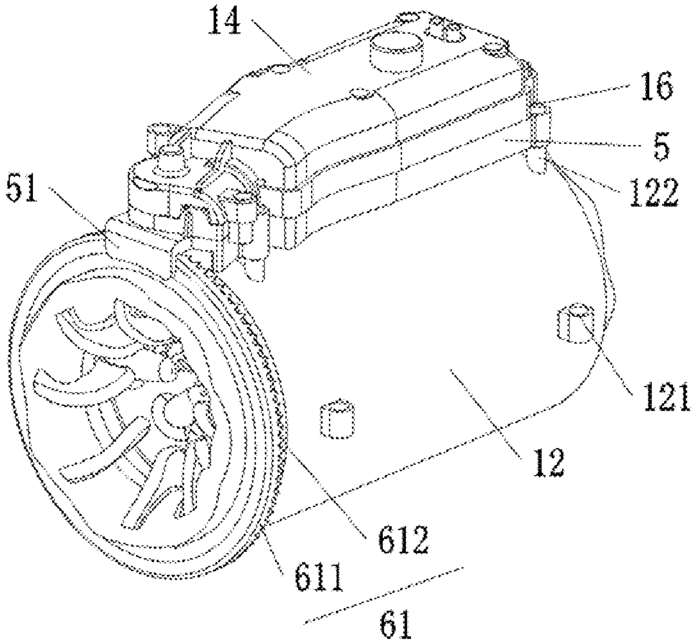
FIG. 4 is a schematic structural view (I) of the massager with a left portion and the right portion of the housing removed.

As shown in FIG. 4, the inner sleeve 10 is located in a cavity of the cylindrical inner housing 12 and is coaxially nested with the inner sleeve, and an end portion of the inner sleeve 10 forming the gear ring 61 is located outside the cylindrical inner housing 12. The first mounting rack 5 is fixed on a circumferential wall of the cylindrical inner housing 12, and a mounting structure in which the insertion cylinder is in fit with the insertion column 122 and which is furthered fastened by a screw can also be used.

To complete assembly, the silica gel cylinder 3 can be fixed in the cavity of the sleeve body 2 first, then the sleeve body 2 is placed in the cavity of the cylindrical inner housing 12, the mounting rack 5 on which the components such as the first driving motor 17, the turbine 42 and the first worm 41 are fixed is fixed on the cylindrical inner housing 12, the turbine 42 is synchronously meshed with the gear ring 61 of the inner sleeve 10, and the left portion 112 and the right portion 111 of the outer housing 11 are combined to fix the cylindrical inner housing 12.

In use, the region to be massaged can be placed in the silica gel cylinder 3, and the driving motor 17 can be started by pressing the switch 7. The size can also be correspondingly increased for massaging arms and the like.

Figure 17:
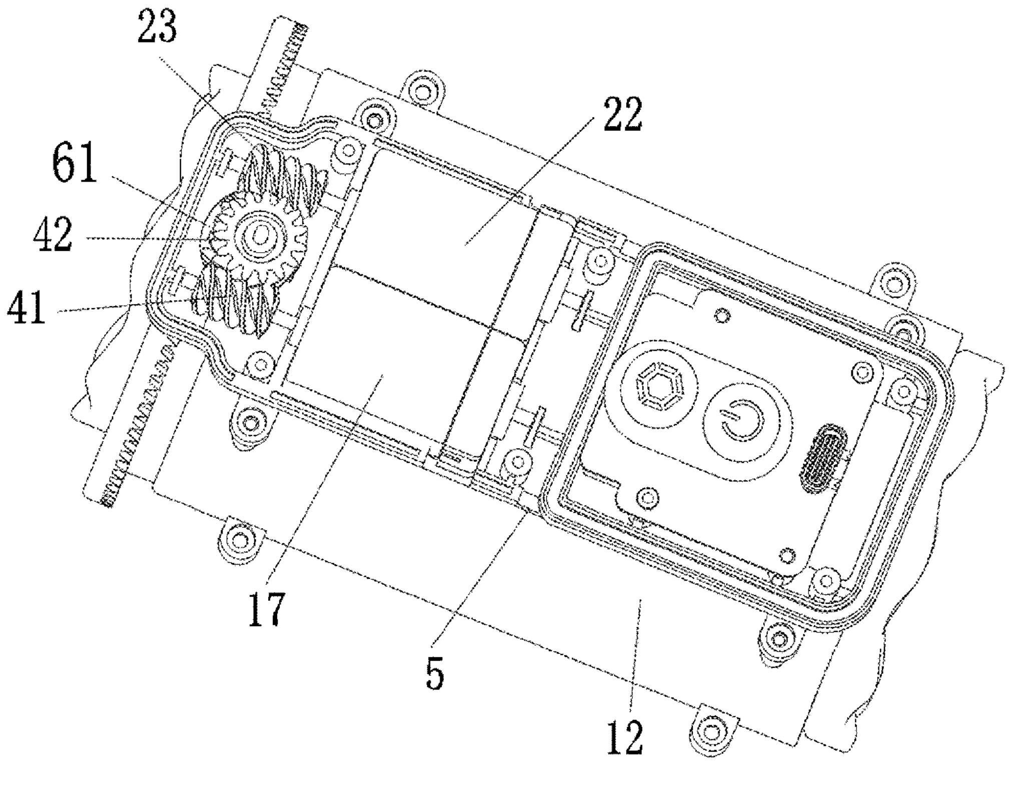
FIG. 17 is a schematic structural view of a massager having a second worm and a second driving motor.

In addition, in another embodiment, the second housing cavity 114 communicating with the accommodating hole 13 is formed on the left portion 112 to accommodate the second mounting rack, the second mounting rack 18 is fixed on the circumferential wall of the cylindrical inner housing 12, and a mounting structure in which the insertion cylinder is in fit with the insertion column 122 and which is further fastened by a screw can also be used, as shown in FIG. 17.

What is claimed is:

1. A massager, comprising a housing, wherein an accommodating hole is provided on the housing and extends through the housing, a sleeve body is axially provided in a cavity of the accommodating hole, and the sleeve body is rotatably arranged relative to a cavity wall of the accommodating hole;

an elastic cylinder body is axially fixed in a cavity of the sleeve body, and a plurality of elastic protrusions are distributed on a cavity wall of the elastic cylinder body;

a first side portion of the accommodating hole forms a first housing cavity, a first driving motor is provided in the first housing cavity, and the first driving motor is in transmission connection with the sleeve body via a transmission mechanism to drive the sleeve body to rotate axially;

the transmission mechanism comprises a gear and a gear ring provided on the sleeve body, the gear ring is arranged convexly along an outer peripheral surface of the sleeve body, the gear is driven to rotate by a driving force directly provided by the first driving motor or a driving force indirectly provided by the first driving motor, the gear is arranged in mesh with the gear ring to drive the sleeve body to rotate, and the gear is a spur gear, a turbine or a straight bevel gear;

the gear ring comprises a ring body provided convexly along the outer peripheral surface of the sleeve body and a plurality of gear teeth formed on the ring body, and the plurality of gear teeth are arranged in an annular array and meshed with the gear; and the housing comprises an outer housing and a cylindrical inner housing, the accommodating hole is provided on the outer housing, the cylindrical inner housing is axially fixed in the cavity of the accommodating hole, and the cylindrical inner housing is nested with the sleeve body.

2. The massager according to claim 1, wherein the sleeve body comprises an inner sleeve and a rotary sleeve, the gear ring is provided on the rotary sleeve, the turbine is provided along a radial direction of the inner sleeve, the inner sleeve is rotatably arranged relative to the cavity wall of the accommodating hole, the rotary sleeve is sleeved on the inner sleeve, the rotary sleeve is connected with the inner sleeve via a linear translation guide structure, an outer wall of the inner sleeve is provided with a guide portion, the cavity of the accommodating hole is provided with a fixedly arranged positioning member, when the inner sleeve rotates, the positioning member is in fit with the guide portion to enable the inner sleeve to perform telescopic translation, the positioning member is arranged on an inner wall of the cylindrical inner housing, and the elastic cylinder body is axially fixed in a cavity of the inner sleeve.

3. The massager according to claim 2, wherein the positioning member comprises a column body, the guide portion comprises an annular track groove arranged along a circumferential direction of the inner sleeve, the column body is placed in the annular track groove, the annular track groove comprises two sections of linear grooves and two sections of inclined grooves which are oppositely arranged, both ends of a first section of linear groove are respectively connected and communicated with a first end of each of the two sections of inclined grooves via transition grooves, and both ends of a second section of linear groove are respectively connected and communicated with a second end of each of the two sections of inclined grooves via transition grooves.

4. The massager according to claim 3, wherein the linear translation guide structure comprises a positioning column formed on an inner wall of the rotary sleeve and a linear guide long groove formed on the outer wall of the inner sleeve, and the positioning column is inserted into the linear guide long groove.

5. The massager according to claim 1, wherein the gear is the turbine arranged in the first housing cavity along a radial direction of the sleeve body, the transmission mechanism further comprises a first worm, the turbine is in meshing connection with the first worm and the gear ring respectively, and the first worm is fixed on an output shaft of the first driving motor.

6. The massager according to claim 1, wherein a first mounting rack is provided in the first housing cavity, the first driving motor is mounted on the first mounting rack, a first stop plate is provided on the first mounting rack and extends to a front of an end portion of the sleeve body so as to limit the gear ring at the end portion of the sleeve body.

7. The massager according to claim 2, wherein a second driving motor and a second worm are further provided in the first housing cavity, the second worm is meshed with the turbine, the second worm is fixed on an output shaft of the second driving motor, and the second driving motor is mounted on a first mounting rack.

8. The massager according to claim 2, wherein a second side portion of the accommodating hole further forms a second housing cavity, a third driving motor, a third worm, and a third turbine are provided in the second housing cavity, the third turbine is meshed with the third worm and the plurality of gear teeth of the gear ring respectively, and the third worm is fixed on an output shaft of the third driving motor.

9. The massager according to claim 8, wherein a second mounting rack is provided in the second housing cavity, and the third driving motor is mounted on the second mounting rack.

10. The massager according to claim 9, wherein a second stop plate is provided on the second mounting rack, and an inner wall of the second stop plate is close to a side surface of the gear ring relative to the gear teeth.

11. The massager according to claim 1, wherein the housing has a left portion and a right portion which are fixedly formed, grooves are formed on surfaces corresponding to the left portion and the right portion, the left portion and the right portion are combined to form the accommodating hole, and the first housing cavity is formed inside the right portion.

12. The massager according to claim 5, wherein a battery, a control circuit board, and a switch are provided on a first mounting rack, and the control circuit board is connected with the battery, the switch, and the first driving motor respectively.

13. The massager according to claim 1, wherein the elastic cylinder body is made of silica gel, and sheet-like protrusions are spaced at both end cavity walls in a cylinder cavity of the elastic cylinder body, and columnar protrusions are spaced at a middle cavity wall in the cylinder cavity.

* * * * *